(12) United States Patent
Oliveira et al.

(10) Patent No.: US 6,251,045 B1
(45) Date of Patent: Jun. 26, 2001

(54) METHOD AND APPARATUS FOR PROVIDING SYNCHRONIZATION OF LOW TO HIGH SHIFTS IN A TRANSFER CASE

(75) Inventors: Gary A. Oliveira, Lake Orion, MI (US); Richard Thomas Fosmoe, Filderstadt (DE); John R. Ficht, Chesterfield Township, MI (US)

(73) Assignee: BorgWarner Inc., Troy, MI (US)

(*) Notice: Subject to any disclaimer, the term of this patent is extended or adjusted under 35 U.S.C. 154(b) by 0 days.

(21) Appl. No.: 09/484,472

(22) Filed: Jan. 18, 2000

(51) Int. Cl.[7] .............. F16H 59/30; F16H 3/44; F16H 3/38
(52) U.S. Cl. .............. 477/124; 475/303; 74/339
(58) Field of Search .............. 74/339; 475/33, 475/153, 273; 477/124

(56) References Cited

U.S. PATENT DOCUMENTS

| | | | |
|---|---|---|---|
| 4,664,217 | 5/1987 | Welch et al. | 180/247 |
| 4,718,303 | 1/1988 | Fogelberg | 74/710.5 |
| 4,828,070 | 5/1989 | Maramatsu | 180/247 |
| 5,150,637 | 9/1992 | Ninomiya et al. | 74/335 |
| 5,346,442 | 9/1994 | Eastman | 475/223 |
| 5,389,053 | * 2/1995 | Steeby et al. | 477/124 X |
| 5,407,024 | 4/1995 | Watson et al. | 180/248 |
| 5,425,284 | * 6/1995 | Davis | 477/124 X |
| 5,508,916 | * 4/1996 | Markyvech et al. | 477/124 X |
| 5,653,143 | * 8/1997 | Langevin | 74/339 X |
| 5,680,308 | 10/1997 | Warren | 364/424.098 |
| 5,688,205 | * 11/1997 | Buhler | 477/124 X |
| 5,699,870 | 12/1997 | Warren | 180/247 |
| 5,704,867 | 1/1998 | Bowen | 475/221 |
| 5,771,477 | * 6/1998 | Showalter et al. | 475/295 X |
| 5,867,092 | 2/1999 | Vogt | 340/456 |
| 6,022,289 | * 2/2000 | Francis | 475/303 X |
| 6,164,149 | * 12/2000 | Ohmori et al. | 477/124 X |
| 6,165,103 | * 12/2000 | Tenzor et al. | 477/127 |

\* cited by examiner

Primary Examiner—Charles A Marmor
Assistant Examiner—Roger Pang
(74) Attorney, Agent, or Firm—Bliss, McGlynn, P.C.; Greg Dziegielewski

(57) ABSTRACT

A transfer case includes an input shaft, an output shaft, and a gear set selectively operable to translate torque between the input and output shafts at reduced speeds. A clutch is operable to translate torque between the input and output shafts either directly or through the gear set. An actuator, having a rotational output, is operatively coupled to the clutch for moving the clutch between predetermined positions. A control unit is employed in connection with the transfer case to effect the method of synchronizing low to high shifts in the transfer case. To this end, the control unit calculates the speed of the actuator as it moves the clutch to a neutral position. The control unit further determines the additional time until the clutch will reach a predetermined synchronization point using the speed of the actuator and the remaining rotational distance through which the actuator must move for the clutch to reach the predetermined synchronization point. The control unit is further operable to stop the actuator when the clutch has reached the synchronization point for no longer than a predetermined time. The control unit then senses and compares the rotational speeds of the input and output shafts and signals the actuator to complete the shift from low to high by moving the clutch to provide direct torque translation between the input and output shafts when the difference in the rotational speeds of the input and output shafts is less than a predetermined value.

31 Claims, 6 Drawing Sheets

METHOD AND APPARATUS FOR PROVIDING SYNCHRONIZATION OF LOW TO HIGH SHIFTS IN A TRANSFER CASE

BACKGGROUND OF THE INVENTION

1. Field of the Invention

The present invention relates, generally, to two-speed (high-low) transfer cases and, more particularly, to a method and apparatus for shifting between low and high gearing arrangements for a two-speed transfer case.

2. Description of the Related Art

Transfer cases are used in full and part-time, four-wheel drive vehicles to distribute driving power received through an input shaft from the vehicle's transmission to a pair of output drive shafts. One of the drive shafts powers the vehicle's front wheels and the other of the drive shafts powers the vehicle's rear wheels. In vehicles that permit shifting between two-wheel drive and four-wheel drive modes, the input shaft of the transfer case provides continuous drive power to one of its output shafts and selectively provides drive power to the other output shaft via some type of disengageable or otherwise adjustable coupling, such as a viscous coupling, electromagnetic clutch, or positionable spur gearing. Other drive modes are sometimes provided, including four-wheel drive high (4H) for higher four-wheel drive speeds, four-wheel drive low (4L) for lower four-wheel drive speeds, neutral for disengaging the transmission from the front and rear axles to allow towing, and locked four-wheel drive for controlling wheel slippage. Historically, transfer cases were configured such that the vehicle had to be stopped before shifting between low and high gears. Typically, this requirement resulted from the lack of any type of synchronizer within the transfer case to facilitate this shift. In these cases, an adjustable coupling was used to manually shift between drive modes using a mechanical shift actuator.

On the other hand, synchronization of the input and output shafts of the transfer case prior to shifting between low and high gears and into and out of four-wheel drive facilitates shifts while the vehicle is moving. This mode of operation has been referred to as shift "on the fly." Numerous synchronization devices have been proposed in the related art. For example, it is known to employ a clutch which is operable to translate torque either directly between the input and output shafts (high speed) or between the input and output shafts via a planetary gear reduction set. Clutches of this type may be spring-biased such that shifting is not fully accomplished until the relative speeds of the rotating members to be coupled have achieved a certain level of synchronization. However, some synchronization devices known on the related art have suffered from the disadvantage that they are overly complex and add excessive cost to the transfer case. Others have failed to achieve adequate synchronization prior to the shifting event resulting in slip and/or unacceptable noise.

Mechanical shift actuators gave way to electronically controlled shift actuators, particularly for shift actuators that can be operated by a rotational source, such as an electric motor. U.S. Pat. No. 4,664,217 issued to Welsh et al. on May 12, 1987 discloses such an electric shift actuator. More specifically, the Welsh et al. '217 patent teaches the use of a reversible dc electric motor to rotate a cammed shift actuator to selectively shift drive gearing within the transfer case between a neutral position, two-wheel drive mode and low and high speed four-wheel drive modes. Selection of a desired drive mode is accomplished by operating the motor under the control of a microprocessor-based control circuit. The microprocessor commands a motor drive circuit to energize the motor to run in either the clockwise or counterclockwise direction to achieve the desired drive mode. While this type of electronic shift control was an improvement in the related art, the problem of effectively and efficiently synchronizing the rotation of members to be coupled during any given shifting operation remained.

U.S. Pat. No. 5,771,477 issued to Showalter et al. on Jun. 23, 1998, proposed one solution for this problem. More specifically, the Showalter '477 patent discloses a method and apparatus for synchronizing low to high transfer case shifts using sensors to sense the speed of the input and output shafts of the transfer case. A microprocessor is employed to measure the change in speed over time of each of the input and output shafts and to make a prediction when the relative speeds of the shafts will be equal. The microprocessor then commands operation of a shift actuator at a predetermined time before the shafts are synchronized such that shifting is accomplished when the speeds of the input and output shafts are substantially equal.

While the '477 method and apparatus was an improvement over the related art, there still remains a need for greater control and more accurate synchronization prior to shifting between low and high speeds in a transfer case. In addition, there remains a need to achieve such synchronization in an efficient, cost-effective and relatively simply manner.

SUMMARY OF THE INVENTION

The present invention overcomes the disadvantages in the related art in a transfer case having synchronized low to high shift capabilities. More specifically, the transfer case includes an input shaft, an output shaft, and a gear set selectively operable to translate torque between the input and output shafts at reduced speeds. A clutch is operable to translate torque between the input and output shafts either directly or through the gear set. An actuator, having a rotational output, is operatively coupled to the clutch for moving the clutch between predetermined positions. A control unit is employed in connection with the transfer case to effect the method of synchronizing low to high shifts in the transfer case. To this end, the control unit calculates the speed of the actuator as it moves the clutch to a neutral position. The control unit further determines the additional time until the clutch will reach a predetermined synchronization point using the speed of the actuator and the remaining rotational distance through which the actuator must move for the clutch to reach the predetermined synchronization point. The control unit is further operable to stop the actuator when the clutch has reached the synchronization point for no longer than a predetermined time. The control unit then senses and compares the rotational speeds of the input and output shafts and signals the actuator to complete the shift from low to high by moving the clutch to provide direct torque translation between the input and output shafts when the difference in the rotational speeds of the input and output shafts is less than a predetermined value.

Accordingly, the present invention is a method and apparatus for providing synchronization of low to high shifts in a transfer case which allows for a high level of control and an accurate synchronization prior to shifting between low and high speeds. Furthermore, these objectives are achieved with the method and apparatus of the present invention in an efficient, cost effective and relatively simple manner.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
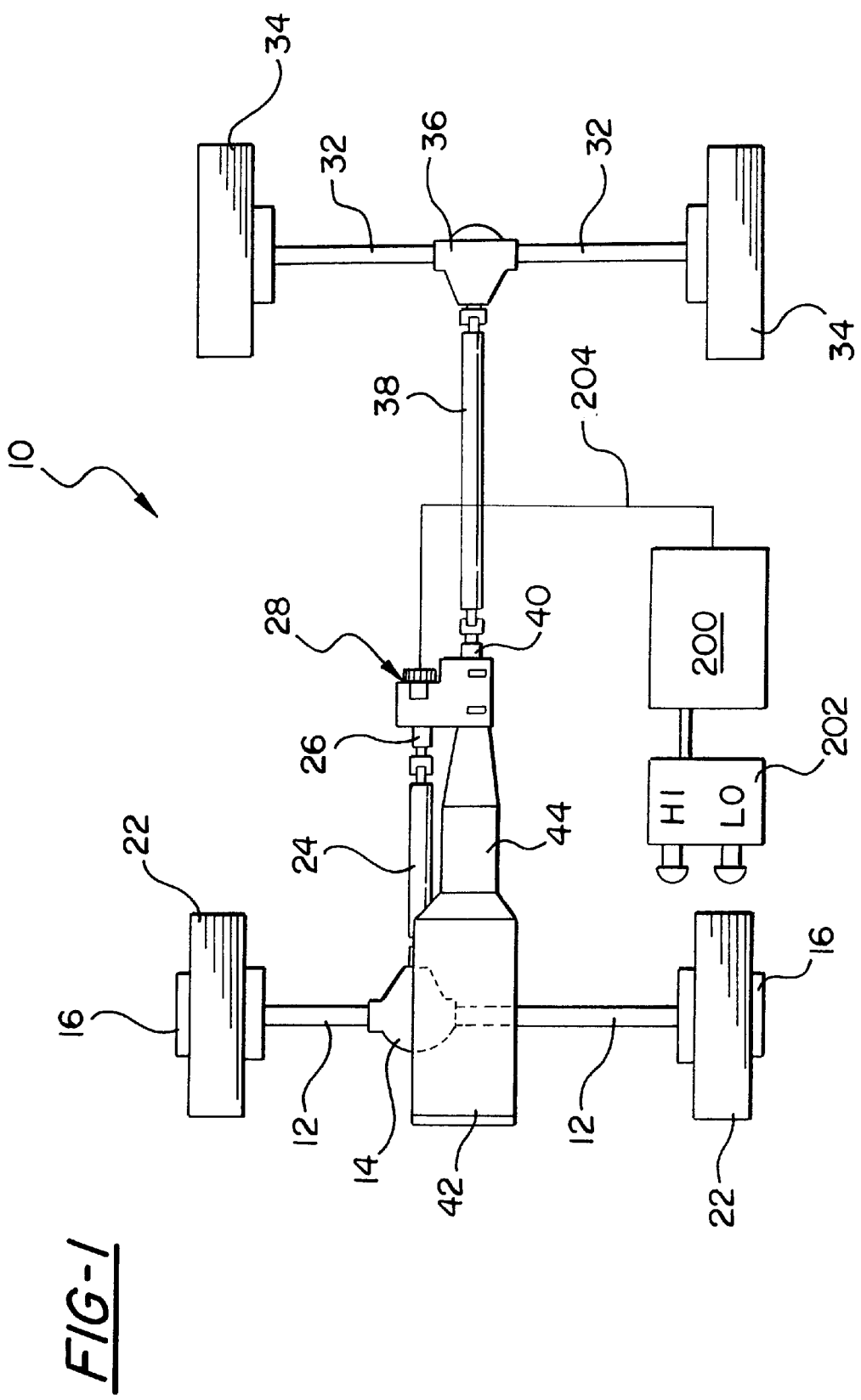
FIG. 1 is a schematic view of a vehicle drive line and associated components of a synchronous shift system according to the present invention.

A vehicle having a four-wheel drive system and a two-speed transfer case incorporating the present invention is schematically illustrated in FIG. 1 and generally indicated at 10. The vehicle 10 includes a pair of front (secondary) axles 12 which are centrally coupled to a front (secondary) differential 14. The outer ends of the front (secondary) axles 12 may be connected to a respective pair of locking hubs 16. The locking hubs 16 are preferably vacuum operated and are in fluid communication with a controlled vacuum source (not shown) through associated vacuum lines (also not shown). When a vacuum is present in the vacuum lines, the hubs 16 lock and couple the front (secondary) axles 12 to a respective pair of front (secondary) tire and wheel assemblies 22. It will be appreciated that either electrically or mechanically operated locking hubs 16 may be utilized with the present invention. As a first alternative, live front (secondary) axles 12 may be utilized with a front (secondary) axle disconnect (not illustrated) disposed in the front (secondary) differential 14. Additionally, the front (secondary) axles 12 may be permanently coupled to both the front tire and wheel assemblies 22 and the front differential 14 and driven by its input. The front differential 14 is driven by a front (secondary) drive or prop shaft 24 which, in turn, is driven by the front (secondary) output shaft 26 of a transfer case, generally indicated at 28.

The vehicle 10 further includes a pair of aligned, rear (primary) axles 32. The outer ends of the axles 32 are coupled to rear (primary) tire and wheel assemblies 34 and their opposite ends are coupled to and driven by a rear (primary) differential 36. The rear differential 36, in turn, is driven by a rear (primary) drive or prop shaft 38 which is, in turn, driven by a rear (primary) output shaft 40 of the transfer case 28. It will be appreciated that the various aforementioned shafts are coupled by a plurality of universal joints as needed in accordance with conventional vehicle drive train practice. A prime mover, such as an internal combustion engine 42 drives a conventional transmission 44 which may be either a manual transmission with a clutch or an automatic transmission.

The designations "primary" and "secondary" appearing above refer to drive lines in a vehicle 10 which are primarily and secondarily intended to propel the vehicle 10. In the following description, the inventors have described a system in which the rear drive shaft 38 transmits all drive torque to the rear wheels 34 in two-wheel drive mode and delivers a portion of the torque in the four-wheel drive mode. Accordingly, in the vehicle 10, the rear drive shaft 38 may, more generically, be referred to or designated the primary drive or prop shaft 38 and this shaft 38 and the associated components, the axles 32, the rear tire and wheel assemblies 34 and the rear differential 36, constitute the primary drive line. Conversely, the front drive shaft 24 is disengaged in two-wheel drive mode but will transfer drive torque in the four-wheel drive mode. Thus, the front drive shaft 24 may, more generically, be referred to or designated the secondary drive or prop shaft 24 and this shaft 24 and the associated components, the front axles 12, the front differential 14, the locking hubs 16, the front tire and wheel assemblies 22 constitute the secondary drive line.

It should be understood that the drive line components of the vehicle 10 described herein are fully suitable for use with vehicle drive systems conventionally designated front-wheel drive where the front drive shaft 24 and associated components will be the primary drive line and the rear drive shaft 38 and associated components will thus be the secondary drive line.

Figure 2:
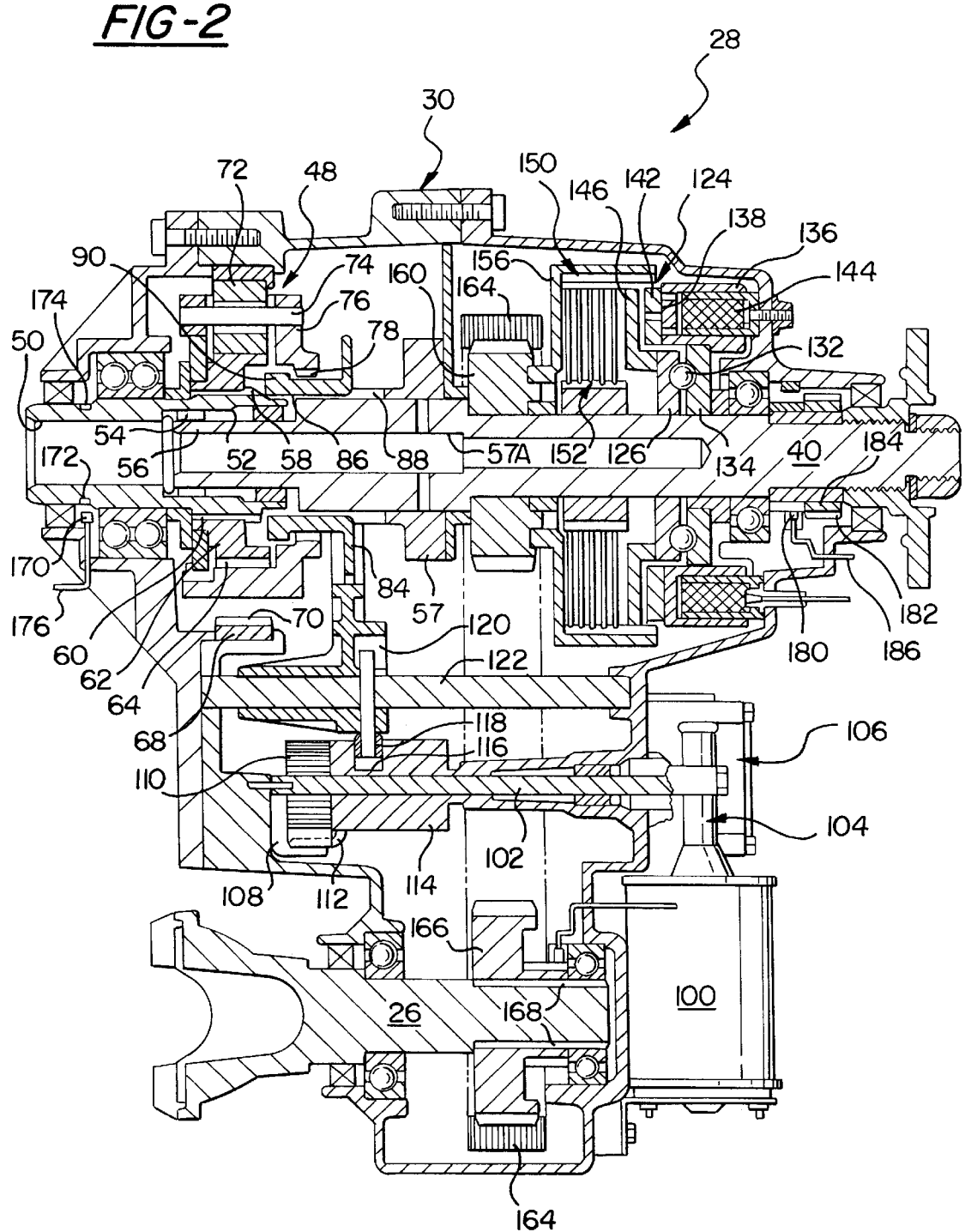
FIG. 2 is a full, cross-sectional side view of a two-speed transfer case according to the present invention.

With reference now to FIG. 2, the transfer case 28 of the present invention will be described in greater detail. The transfer case 28 includes a housing, generally indicated at 30, which is preferably cast of metal in two mating sections and includes apertures, blind openings, supports, bearing receiving surfaces and other features specifically adapted to receive the components of the transfer case 28. More specifically, the transfer case 28 includes a planetary gear set, generally indicated at 48, which is driven by an input shaft 50 rotatably disposed within the transfer case 28. The input shaft 50 is coupled to and driven by the output of the transmission 44. The input shaft 50 defines a re-entrant bore 52 which receives a roller bearing assembly 54. The roller bearing assembly 54, in turn, receives and rotatably supports the forward terminus 56 of the rear (primary) output shaft 40 of the transfer case 28. A gerotor pump 57 is secured about and rotates with the output shaft 40, providing lubricating fluid under pressure to a passageway 57A which extends axially within the output shaft 40 and distributes lubricating fluid to the components of the transfer case 28.

The exterior surface of the input shaft 50 defines a plurality of external teeth 58 which engage complementarily formed teeth 60 on the inner circular surface of a sun gear 62 of the planetary gear set 48. The sun gear 62 is thus coupled to the input shaft 50 for rotation therewith. The sun gear 62 includes a plurality of gear teeth 64 disposed about its periphery. A ring gear 68 is aligned with the sun gear teeth 64. The ring gear 68 has inwardly directed gear teeth 70. A plurality of pinion gears 72 are rotatably received upon a like plurality of stub shafts 74 which are mounted within a carrier 76. The carrier 76 includes a plurality of inwardly directed teeth 78 disposed on a surface generally adjacent the external teeth 58 defined by the input shaft 50. The planetary gear set 48 is more fully described in U.S. Pat. No. 4,440,042 which is assigned to the assignee of the present invention and which is incorporated herein by reference.

A clutch 84 is received about the output shaft 40 and is supported thereon for axial, sliding movement relative to the output shaft 40. In the embodiment illustrated in FIG. 2, the clutch 84 is of the dog type. The clutch 84 defines an inwardly directed plurality of teeth 86 which are complementary to and mate with a like plurality of external teeth 88 disposed on the output shaft 40. The dog clutch 84 thus rotates with the output shaft 40 but may slide axially therealong. The teeth 86 are also complementary to the external teeth 58 on the input shaft 50. The dog clutch 84 further includes a plurality of external teeth 90 which are complementary to the teeth 78 disposed on the carrier 76 and which may be selectively mated therewith as will be described in greater detail below.

The dog clutch 84 is axially translatable to a first, forward position wherein the external teeth 58 couple with the teeth 86 and thus provide direct torque translation and therefore drive between the input shaft 50 and the output shaft 40. In order to facilitate the smooth engagement between the external teeth 58 on the input shaft 50 and the teeth 86 of the dog clutch 84, the transfer case 28 may include a mechanical synchronizer (not shown) which acts to reduce the rotational speed of the input shaft 50 so that it approaches the rotational speed of the output shaft 40 during low to high shifts, as is commonly known in the art. On the other hand, when the dog clutch 84 is translated fully to the rear, it couples the carrier 76 to the output shaft 40 through the mating of the teeth 78 and external teeth 90 on the dog clutch 84. In this position, the speed of the output shaft 40 relative to the input shaft 50 is reduced in accordance with the selected gear ratio of the planetary gear set 48. In addition, the dog clutch 84 may also be moved to third, neutral position, midway between the forward, direct drive position and the rear, reduced speed drive position. The neutral position is illustrated in FIG. 2. In the middle, neutral position, the input shaft 50 is disconnected from the output shaft 40 and no torque is translated therebetween.

The position of the dog clutch 84 is commanded by an actuator 100. In the preferred embodiment, the actuator is an electric shift control motor 100. The electric shift control motor 100 rotates a drive shaft 102 through a worm gear drive, generally indicated at 104. The drive shaft 102 is suitably supported for rotation with the housing 30 of the transfer case 28. The position of the drive shaft 102 is monitored and read by an encoder assembly, generally indicated at 106, which provides information about the current position of the drive shaft 102 and the dog clutch 84.

The drive shaft 102 terminates in an arm 108 which is coupled to a spring assembly 110. The spring assembly 110 is wrapped about the drive shaft 102 and is also engaged by an arm 112 which extends axially from acylindrical cam 114. The spring assembly 110 functions as a resilient coupling between the drive shaft 102 and the cylindrical cam 114 to absorb lag between the movement commanded by the drive motor 100 and the drive components so that the shift motor 100 is allowed to reach its final requested position. The spring assembly 110 allows smooth and fast response to a requested repositioning of the dog clutch 84 in situations where the inwardly directed teeth 86 of the dog clutch 84 do not instantaneously engage the teeth 78 of the carrier 76. When synchronization of the input shaft 50 and the dog clutch 84 has been substantially achieved, any potential energy stored in the spring assembly 110 rotates the cylindrical cam 114 to its requested position, thus completing the shift.

The cylindrical cam 114 defines a helical track 116 which extends approximately 270 degrees about the cam 114. The helical track 116 receives a pin and cam follower 118 which is coupled to a fork assembly 120. The fork assembly 120 is supported for bidirectional translation upon a fixed shaft 122 and engages the periphery of the dog clutch 84. Bi-direction movement of the fork assembly is induced through the cam follower 118 as it moves along the helical track 116. More specifically, rotation of the shaft 102 axially repositions the cam follower assembly 118 and thus axially positions the dog clutch 84 through the fork assembly 120 to one of the three positions described above.

Figure 3:
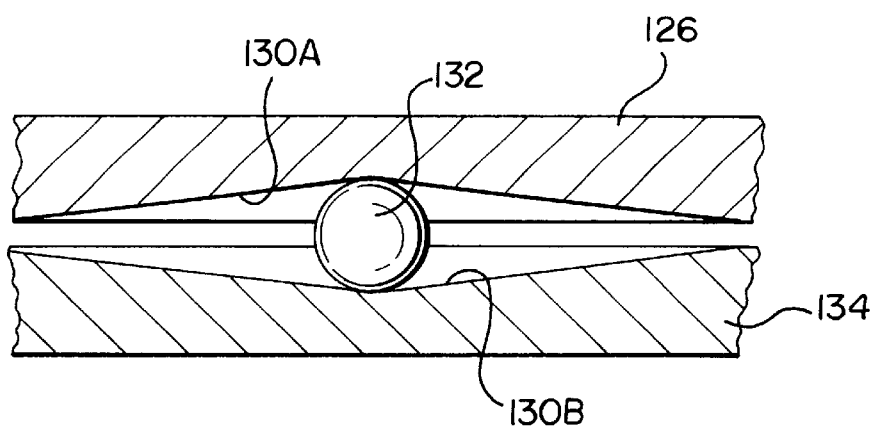
FIG. 3 is a flat Pattern development of the load transferring balls and ramp in the modulating clutch of the transfer case of the present invention.
Figure 4:
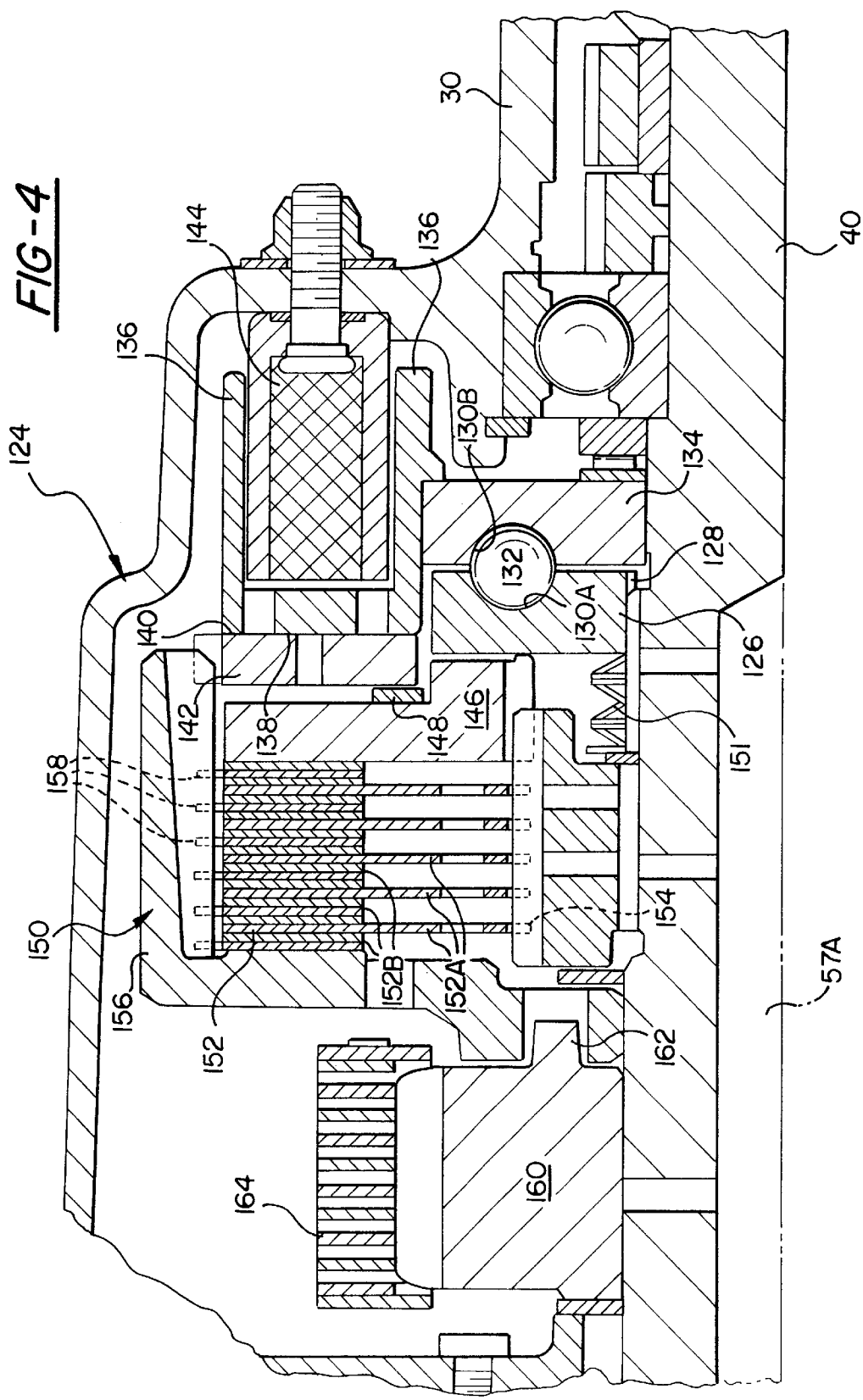
FIG. 4 is an enlarged, fragmentary, cross-sectional side view of the electromagnetic clutch assembly according to the present invention.

Referring now to FIGS. 2 and 4, the transfer case 28 also includes an electromagnetically actuated disk pack type clutch assembly 124. The clutch assembly 124 is disposed about the output shaft 40 and includes a circular drive member 126 which is coupled to the output shaft 40 through a splined interconnection 128. The circular drive member 126 includes a plurality of circumferentially spaced apart recesses 130A in the shape of an oblique section of a helical torus as illustrated in FIG. 3. Each of the recesses 130A receives one of a like plurality of load transferring balls 132.

A circular, driven member 134 is disposed adjacent to the circular drive member 126 and includes a like plurality of opposed recesses 130B defining the same shape as the recesses 130A. The oblique side walls of the recesses 130A and 130B function as ramps or cams and cooperate with the balls 132 to drive the circular members 126, 134 apart in response to relative rotation therebetween. However, those having ordinary skill in the art will appreciate that the recesses 130A and 130B as well as the load transferring balls 132 may be replaced with other analogous mechanical elements which cause axial displacement of the circular, drive and driven members 126, 134, respectively, in response to relative rotation therebetween. For example, tapered rollers disposed in complementary, configured, conical helices may be employed here.

The circular driven member 134 extends radially outwardly and is secured to a rotor which also serves as an electromagnetic coil housing 136. The coil housing 136 includes a face 138 which is disposed in opposed relationship with a clutch face 140 on an armature 142. The coil housing 136 defines a U-shape in cross-section and surrounds an electromagnetic coil 144 on three sides.

The electromagnetic coil 144 is provided with incrementally adjusted levels of electrical energy from a pulse width modulation (PWM) control (not shown). The pulse width modulation scheme utilized in the present invention is conventional and increases or decreases the average current to the coil 144 of the electromagnetic clutch assembly 124 and thus torque throughput by increasing or decreasing the on-time (duty cycle) of a thirty-three (33) Hertz signal. However, those having ordinary skill in the art will appreciate that other modulating control techniques may be utilized to achieve incremental engagement and disengagement of the modulating clutch assembly 124.

Providing electrical energy to the electromagnetic coil 144 causes magnetic attraction of the armature 142 to the coil housing 136. This magnetic attraction results in frictional contact of the armature 142 to the coil housing 136. When the output shaft 40 is turning at a different speed than the armature 142 which turns at the same rotational speed as the secondary output shaft 26, this frictional contact results in a frictional torque being transferred from the output shaft 40 through the circular drive member 126, through the load transferring balls 132 and to the circular driven member 134. The resulting frictional torque causes the balls 132 to ride up the ramps of the recesses 130A and 130B causing axial displacement of the circular drive member 126. Axial displacement of the circular drive member 126 translates an apply plate 146 and a washer 148 disposed between the armature 142 and the apply plate 146 axially toward a disk pack clutch assembly, generally indicated at 150. A compression spring 151 provides a restoring force which biases the circular drive member 126 toward the circular driven member 134 and returns the load transferring balls 132 to center positions in the circular recesses 130A and 130B to provide maximum clearance and minimum friction between the components of the electromagnetic clutch assembly 124 when it is deactivated.

The disk pack clutch assembly 150 includes a plurality of interleaved friction plates or disks 152. A first plurality of disks 152A are coupled by inter-engaging splines 154 to a clutch hub 155 which is coupled to the output shaft 40 for rotation therewith. A second plurality of disks 152B are coupled to an annular housing 156 by inter-engaging splines 158 for rotation therewith.

The annular housing 156 is disposed for free rotation about the output shaft 40 and is coupled to a chain drive sprocket 160 by a plurality of inter-engaging lugs and recesses 162. The drive sprocket 160 is also rotatably disposed on the output shaft 40. When the clutch assembly 124 is engaged, it transfers energy from the output shaft 40 to the chain drive sprocket 160. A drive chain 164 is received upon the teeth of the chain drive sprocket 160 and engages and transfers rotational energy to a driven chain and sprocket 166. The driven sprocket 166 is coupled to the front (secondary) output shaft 26 of the transfer case 28 by inter-engaging splines 168.

Those having ordinary skill in the art will appreciate that the design and geometry of the recesses 130A, 130B as well as the balls 132, the design of the washer 148, the compression spring 151 and the clearances in the clutch assembly 124 ensure that the clutch assembly 124 is not self-locking. The electromagnetic clutch assembly 124 must not self-engage, but rather, must be capable of modulating clamping of the clutch disks 152 and torque transfer in direct response to the increment or decremented step-wise PWM control unit. Furthermore, those having ordinary skill in the art will appreciate that while the electromagnetic clutch assembly 124 described above incorporates electromagnetic activation means, it may also be operated in the same manner by hydraulic or pneumatic operators provided with controlled, pressurized hydraulic fluid or pressurized air, respectively.

Referring specifically to FIG. 2, the transfer case 28 also includes an input tone wheel 174 which is coupled to and rotates with the front input shaft 50. A first, input Hall effect sensor 170 is disposed in proximate, sensing relationship with a plurality of teeth 172 on the tone wheel 174. The output of the first Hall effect sensor is carried in electrical conductors 176. Similarly, an output tone wheel 184 is disposed on the rear (primary) output shaft 40. A second output Hall effect sensor 180 is disposed in proximate, sensing relationship with a plurality of teeth 182 on the output tone wheel 184. The output of the second Hall effect sensor 180 is carried in electrical conductors 186. Preferably, the number of teeth 172 on the tone wheel 174 is identical to the number of teeth 182 on the tone wheel 184 so that identical shaft speeds result in the same number of pulses per unit time from the Hall effect sensors 170 and 180. This simplifies computations relating to shaft speeds and improves the accuracy of all logic decisions based on such data and computations. The actual number of teeth 172 on the tone wheel 174 and teeth 182 on the tone wheel 184 may vary from 25 to 50 or more or fewer depending upon the rotational speeds and sensor construction.

The first and second Hall effect sensors 170 and 180 sense the respective teeth 172 and 182 and provide a series of pulses which may be utilized to compute the instantaneous rotational speeds of the input shaft 50 and the rear output shaft 40. The rotational speeds of the input shaft 50 correspond to the rotational speeds of the output of the transmission 44. Likewise, the rotational speed of the rear output shaft 40 correspond to the rotational speed of the rear drive shaft 38.

Hall effect sensors are preferred inasmuch as they provide an output signal which alternates between a well-defined high and low signal value as the sensed teeth pass. However, those having ordinary skill in the art will appreciate that other sensing devices such as, for example, variable reluctance sensors may be utilized. Such sensors do not, however, provide the clean wave form provided by Hall effect sensors, particularly at low shaft speeds, and thus, may require extra input conditioning to provide usable data. It will also be appreciated that the Hall effect sensors 170 and 180 and the respective adjacent teeth 172 and 182 on the tone wheel 174, 184 are preferably located within the housing 30 of the transfer case 28 but may be located at any convenient site along the transmission output/transfer case input shaft 50 and the rear (primary) output shaft 40 and the primary drive line. It is also possible to sense the speed of either or both shafts through a gear reduction unit such as the rear differential 36 if proper scaling factors are included in a signal processor to compensate for the gear ratio of the unit. Thus, the properly scaled outputs of rear wheel speed sensors utilized with an anti-lock brake system, for example, could be averaged to provide the speed of the output shaft 40 subject to the caveat noted above regarding speed sensing at diverse locations along the drive lines.

Referring again to FIG. 1, the signal from the first Hall effect sensor 170 carried in the conductors 176 is provided to a control unit, such as a microprocessor 200. Likewise, the signal from the second Hall effect sensor 180 carried in the conductors 186 is provided to the microprocessor 200. The microprocessor 200 also receives input from an operator-controlled shift change selector 202 which allows manual selection by the operator of either the low or high gear range of the transfer case 28. Signals commanding selection of the operator-selected gear range are provided to the actuator which, in this case, is the shift control motor 100 from the microprocessor 200 through the electrical conductors 204.

Figure 5:
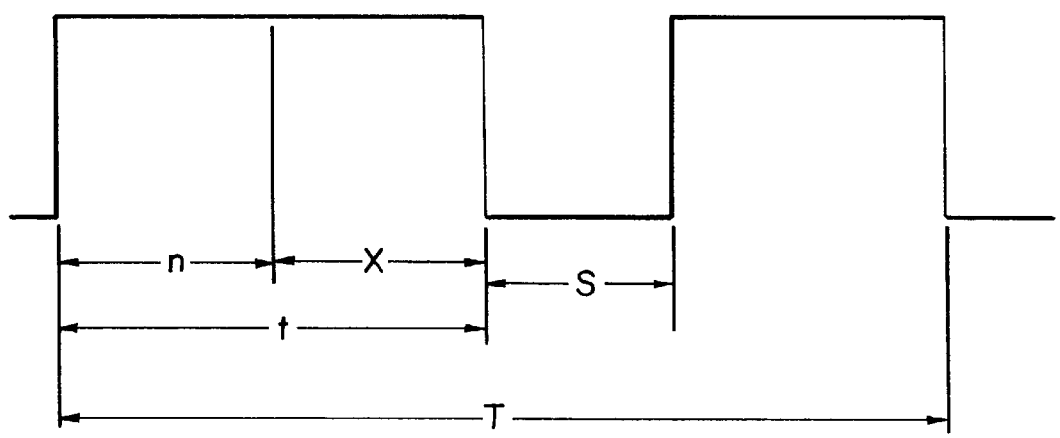
FIG. 5 is a graph of the rotational movement of the actuator of the present invention over time.
Figure 6A:
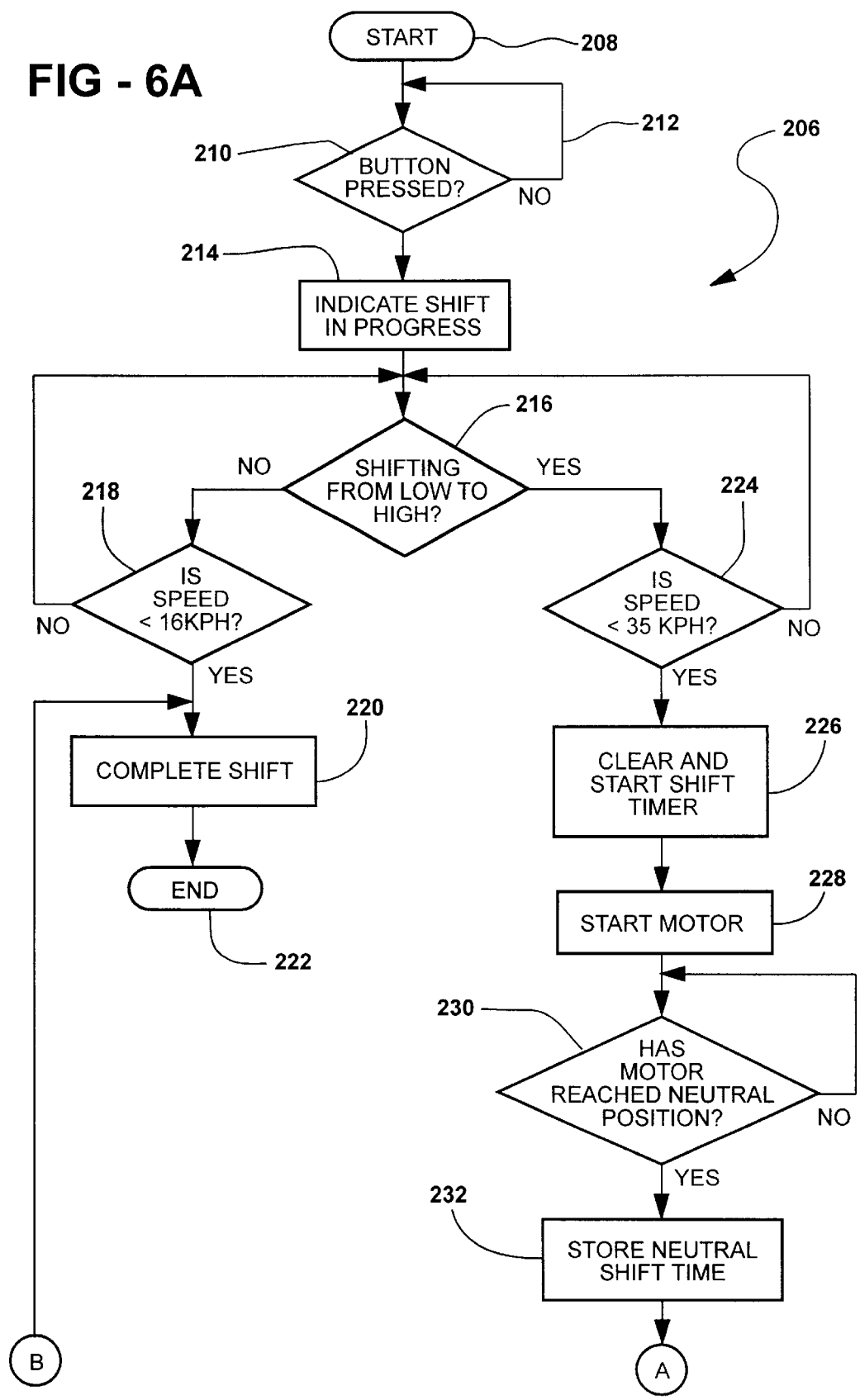
FIGS. 6a–6b is a flow diagram representing the method for providing synchronization of low to high shifts in a transfer case of the present invention.
Figure 6B:
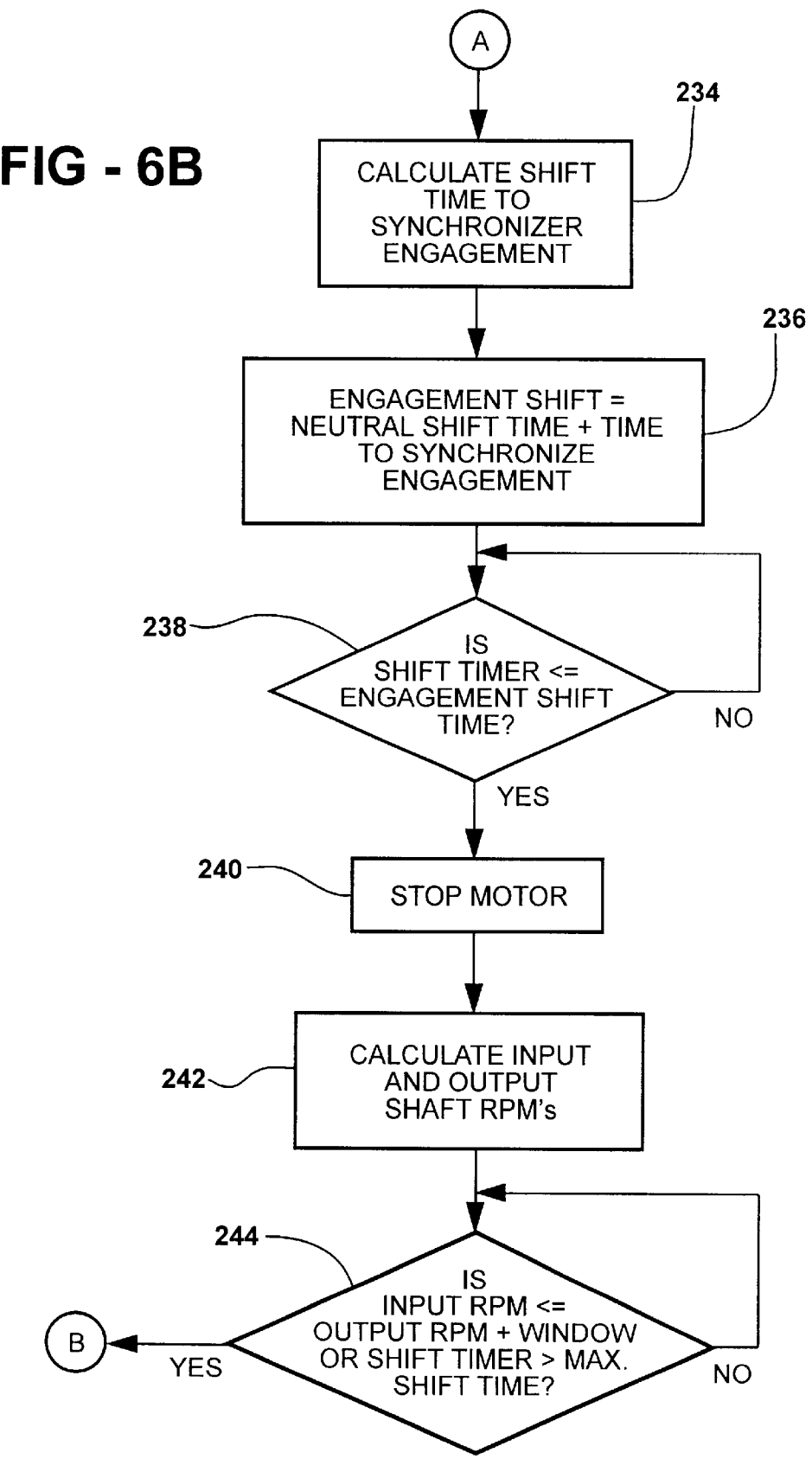

Referring now to FIGS. 5, 6A and 6B, the method of synchronizing low to high shifts in a transfer case of the present invention will be described in greater detail. The method is described in connection with the flow chart 206 which, in essence, outlines a sub-routine of the microprocessor 200. Those having ordinary skill in the art will appreciate that the sub-routine depicted by the flow chart 206 may be only one of a number of other programs or sub-routines which operate within the microprocessor 200. The method of the present invention as illustrated in the sub-routine of the flow chart 206 (FIGS. 6A and 6B), controls the shift control motor or actuator 100 with the object of achieving a virtually undetectable, on-the-fly, shift of the gearing within the transfer case 28. Thus, the method of the present invention controls a shift from a low range, where the torque is translated from the input shaft 50 to the output shaft 40 through the planetary gear set 48, to a high range where torque is translated directly between the input shaft 50 and the output shaft 40 via the dog clutch 84. The method starts at 208. Before the sub-routine is entered, however, an inquiry or decision point 210 will be entered. This decision point 210 will typically form a portion of an executive system or large control loop in a microprocessor vehicle management system (not shown) and it monitors or detects whether the shift change selector 202 has been moved into a low or high position such that a shift has been requested. If no shift has been requested, the related executive system or sub-routine may continue with other interrogations, computations and actions not relevant to the method of the present invention. However, the decision point 210 is continually monitored to detect when a shift has been selected as indicated by feedback line 212.

On the other hand, if a shift has been selected, the operator is given a visual signal that a shift is in progress as indicated at process step 214. This indicator may be a blinking light in the passenger compartment of the automotive vehicle, but it may take the form of any suitable visual or audio indicator. Once a shift has been indicated, decision point 216 is entered. There, the microprocessor 200 determines whether a shift from low to high has been requested. If the answer is no, meaning that the shift is from high to low, the decision point is exited at NO. Thereafter, the decision point 218 is entered and the microprocessor 200 determines whether the speed of the vehicle is less than 16 kilometers per hour (kph). If the vehicle speed is greater than 16 kph, the decision point 218 is exited at NO and the sub-routine returns to decision point 216. If, on the other hand, the vehicle speed is less than 16 kph, the decision point 218 is exited at YES and the shift is completed as indicated at process step 220. Thereafter, the sub-routine ends as indicated at 222. To complete the shift, the shift control motor or actuator 100 moves the dog clutch 84 from its high range position, that is, the position to the left of that illustrated in FIG. 2, to the neutral position, that is, the position in which the dog clutch 84 is illustrated in this figure. Thereafter, and once the speed of the vehicle is less than 16 kph, the shift is completed when the shift control motor 100 moves the dog clutch 84 completely to the right of that shown in FIG. 2 such that torque is translated from the input shaft 50 to the output shaft 40 via the gear set 48 and the dog clutch 84.

Alternatively, and where the shift indicator 202 indicates a shift from low to high, the decision point 216 is exited at YES. In this case, the sub-routine 206 enters the decision point 224 and the microprocessor 200 determines whether the speed of the vehicle is less than 35 kph. If it is not, the decision point 224 is exited at NO and the sub-routine returns to the decision point 216. Thus, in the preferred embodiment, the vehicle must be traveling at less than 35 kph. Furthermore, in the preferred embodiment of the method of the present invention, the vehicle transmission is shifted into neutral before initiating the shift from low to high in the transfer case 28. If the microprocessor 200 determines that the vehicle is traveling at less than 35 kph, the decision point 224 is exited at YES and the shift timer is cleared and started as indicated at process step 226. Thereafter, as indicated at process step 228, the microprocessor 200 initiates the actuator, in this case an electrical motor 100, to move the clutch 84 from engagement with the gear set 48 to a neutral position (illustrated in FIG. 2) and measures the speed of the actuator 100. More specifically, this step includes measuring the time elapsed (n) graphically represented in FIG. 5 during the movement of the clutch 84 to the predetermined neutral position as well as the rotational distance traveled by the motor 100 during this time.

As indicated at decision point 230, the microprocessor 200 also determines when the clutch 84 has reached the predetermined neutral position. If the clutch 84 has not reached the neutral position, the decision point 230 is exited at NO and reenters the decision point 230 until the neutral position has been reached. Ultimately, the time elapsed (n) for the clutch 84 to move to the neutral position is stored at process step 232.

Thereafter, and as indicated in process steps 234 and 236 in FIG. 6B, the microprocessor determines the time (x), graphically represented in FIG. 5, until the clutch 84 will reach a predetermined synchronization point. To do this, the microprocessor 200 uses the speed of the actuator 100 and the remaining rotational distance through which the actuator 100 must move for the clutch 84 to reach the predetermined synchronization point. The microprocessor 200 then signals the actuator 100 to move the clutch until it has reached the predetermined synchronization point as indicated at decision point 238. The microprocessor 200 then stops the actuator after time (t) and when the clutch 84 has reached the predetermined synchronization point for no longer than a predetermined time (s) as indicated at process step 240.

Using the input and output Hall effect sensors 170, 180, the microprocessor 200 then senses and compares the rotational speeds of the transfer case input and output shafts 50, 40, respectively, as indicated by the process step 242. Decision point 244 is then activated when the microprocessor 200 determines whether the rotational speed of the input shaft 50 is less than or equal to the rotational speed of the output shaft 40. If so, the shift from low to high is completed as indicated at process step 220 in FIG. 6A by moving the clutch 84 to provide direct torque translation between the input and output shafts 50, 40, respectively. However, the shift is only completed when the difference in the rotational speed of the input 50 and the output 40 shafts is less than a predetermined value. In one preferred embodiment, this difference may be less than 100 rpm. Alternatively, the decision point 244 will also be exited at YES to complete the shift from low to high if the difference in the rotational speeds of the input and output shafts 50, 40, respectively, is greater than a predetermined value for a predetermined time. More specifically, the shift may be completed when the difference in the rotational speeds of the input and output shafts 50, 40, respectively, is greater than 100 rpm for a predetermined portion of the elapsed time (T) as represented in FIG. 5 from the initiation of the shift. In one preferred method of the present invention, this predetermined portion may represent 20% of the elapsed time (T) from the initiation of the shift. Otherwise, and in the absence of any of these conditions, the decision point 244 is exited at NO and the sub-routine reenters this decision point.

Additionally, if the dog clutch 84 cannot be moved out of engagement with the planetary gear set 48 to the neutral position at the initiation of the shifting event (referred to as a "trapped" condition) the microprocessor 200 will abort the shift requests. The operator is notified of this condition by terminating the shift in progress indicator represented at process step 214.

Accordingly, the present invention is a method and apparatus for providing synchronization of low to high shifts in a transfer case which allows for a high level of control and an accurate synchronization prior to shifting between low and high speeds. Furthermore, these objectives are achieved with the method and apparatus of the present invention in an efficient, cost effective and relatively simple manner.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A method of synchronizing low to high shifts in a transfer case used in an automotive vehicle, said method comprising:

initiating an actuator to move a clutch from engagement with a gear set to a predetermined neutral position and measuring the speed of the actuator;

determining the additional time until the clutch will reach a predetermined synchronization point using the speed of the actuator and the remaining rotational distance through which the actuator must move for the clutch to reach the predetermined synchronization point;

moving the clutch until it has reached the predetermined synchronization point, stopping the actuator when the clutch has reached the predetermined synchronization point for no longer than a predetermined time;

sensing and comparing the rotational speed of the transfer case input and output shafts; and completing the shift from low to high by moving the clutch to provide direct torque translation between the input and output shafts when the difference in the rotational speeds of the input and output shafts is less than a predetermined value.

2. A method as set forth in claim 1 wherein the step of measuring the speed of the actuator includes measuring the time elapsed during movement of the clutch to the predetermined neutral position and the rotational distance traveled by the actuator during this time.

3. A method as set forth in claim 1 further including the steps of determining when the clutch has reached the predetermined neutral position and storing the time elapsed for this movement to take place.

4. A method as set forth in claim 1 further including the step of completing the shift when the difference in the rotational speeds of the input and output shafts is less than 100 rpm.

5. A method as set forth in claim 1 further including the step of completing the shift from low to high if the difference in the rotational speeds of the input and output shafts is greater than a predetermined value for a predetermined time.

6. A method as set forth in claim 5 further including the step of completing the shift from low to high if the difference in the rotational speeds of the input and output shafts is greater than 100 rpm for a predetermined portion of the elapsed time from the initiation of the shift.

7. A method as set forth in claim 6 further including the step of completing the shift from low to high if the difference in the rotational speeds of the input and output shafts is greater than 100 rpm for a 20% of the elapsed time from the initiation of the shift.

8. A method as set forth in claim 1 further including the step of shifting the vehicle transmission into neutral before initiating the shift from low to high in the transfer case.

9. A method as set forth in claim 1 wherein said shift is initiated by actuating a shift change selector.

10. A method as set forth in claim 8 further including the step of providing feedback that a shift is in progress.

11. A method as set forth in claim 1 further including the step of determining whether the shift is to be made from low speed to high speed in the transfer case in response to actuation of the shift change selector.

12. A method as set forth in claim 1 further including the steps of determining whether the speed of the vehicle is less than 35 kilometers per hour, and clearing and starting a shift timer before initiating the actuator to move the clutch from engagement with the gear set to the neutral position.

13. A method as set forth in claim 1 further including the step of determining whether the shift is to be made from high speed to low speed in the transfer case in response to actuation of the shift change selector.

14. A method as set forth in claim 13 further including the steps of determining whether the speed of the vehicle is less than 16 kilometers per hour before initiating the actuator to move the clutch from direct torque translation between the input and output shafts into engagement with the gear set.

15. A transfer case having a synchronized low to high shift comprising:

an input shaft, an output shaft, and a gear set selectively operable to translate torque between said input and output shafts at reduced speeds;

a clutch operable to translate torque between said input and said output shafts either directly or through said gearset, an actuator having a rotational output which is operatively coupled to said clutch for moving said clutch between predetermined positions;

a control unit which calculated the speed of said actuator as it moves said clutch to a neutral position, said control unit further determining the additional time until the clutch will reach a predetermined synchronization point using the speed of the actuator and the remaining rotational distance through which the actuator must move for the clutch to reach said predetermined synchronization point, said control unit further operable to stop the actuator when the clutch has reached said synchronization point for no longer than a predetermined time and sensing and comparing the rotational speeds of said input and output shafts and signaling said actuator to complete the shift from low to high by moving the clutch to provide direct torque translation between said input and output shafts when the difference in the rotational speeds of the input and output shafts is less than a predetermined value.

16. A transfer case as set forth in claim 15 further including a first speed sensor for providing an input shaft speed signal to said control unit.

17. A transfer case as set forth in claim 16 further including a second speed sensor for providing an output shaft speed signal to said control unit.

18. A transfer case as set forth in claim 17 wherein said first and second speed sensors are supported in said transfer case and sense the rotational speeds of said input and output shafts, respectively.

19. A transfer case as set forth in claim 17 wherein said first speed sensor includes an input Hall effect sensor and an input tone wheel, said input tone wheel mounted on said first input shaft for rotation therewith and including a plurality of teeth, said input Hall effect sensor supported in said transfer case adjacent to and in close proximity with said input tone wheel for sensing said teeth on said input tone wheel.

20. A transfer case as set forth in claim 17 wherein said second speed sensor includes an output Hall effect sensor and an output tone wheel, said output tone wheel mounted on said output shaft for rotation therewith and including a plurality of teeth, said output Hall effect sensor supported in said transfer case adjacent to and in close proximity with said output tone wheel for sensing said teeth on said output tone wheel.

21. A transfer case as set forth in claim 15 wherein said gear set is a planetary gear set mounted in said transfer case and operable to reduce speeds between said input and output shafts.

22. A transfer case as set forth in claim 15 wherein said clutch is a dog clutch mounted upon said output shaft and rotatable therewith, said clutch being translatable axially along said output shaft between a first position wherein said clutch engages said gear set and translates torque between said input and output shafts at reduced speeds, a neutral position wherein no torque is translated between said input and output shafts and a second position wherein torque is directly translated between said input and output shafts through said clutch.

23. A transfer case as set forth in claim 22 wherein said clutch includes a synchronization point located between said neutral position and said second position.

24. A transfer case as set forth in claim 23 wherein said actuator includes an electric shift control motor having a rotational output which is operatively coupled to said clutch for moving said clutch to said first position, said second position, said neutral position and said synchronization point.

25. A transfer case as set forth is claim 15 wherein said control unit determines when said clutch has reached said predetermined neutral position and stores the time elapsed for this movement to take place.

26. A transfer case as set forth in claim 15 wherein said control unit commands the actuator to move said clutch to complete the shift from low to high when the difference in the rotational speeds of said input and output shafts is less than 100 rpm.

27. A transfer case as set forth in claim 15 wherein said control unit commands said actuator to move said clutch to complete the shift from low to high when the difference in the rotational speeds of said input and output shafts is greater than a predetermined value for a predetermined time.

28. A transfer case as set forth in claim 27 wherein said control unit commands said actuator to move said clutch to complete the shift from low to high when the difference in the rotational speeds of said input and output shafts is greater than 100 rpm for a predetermined portion of the elapsed time from the initiation of the shift.

29. A transfer case as set forth in claim 28 wherein said control unit commands said actuator to move said clutch to complete the shift when the difference in the rotational speeds of said input and output shafts is greater than 100 rpm for at lease 20 percent of the elapsed time from the initiation of the shift.

30. A transfer case as set forth in claim 15 wherein said control unit determines whether the speed of the vehicle is less than 35 km per hour before initiating said actuator to move said clutch from engagement with said gear set to said synchronization point.

31. A transfer case as set forth in claim 15 wherein said control unit determines whether the speed of the vehicle is less that 16 km per hour before initiating the actuator to move said clutch from direct torque translation between said input and output shafts into engagement with said gear set when said transfer case is shifted from high to low.

* * * * *